(12) United States Patent
Yates III et al.

(10) Patent No.: US 6,413,182 B1
(45) Date of Patent: *Jul. 2, 2002

(54) LIMITED SLIP DIFFERENTIAL HAVING THERMAL COMPENSATING VALVE FOR REGULATING TORQUE BIAS

(75) Inventors: William M. Yates III, Santa Ynez, CA (US); Henry Ty, Attleboro, MA (US)

(73) Assignee: McLaren Automotive Group, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/551,384

(22) Filed: Apr. 18, 2000

Related U.S. Application Data

(63) Continuation of application No. 09/264,282, filed on Mar. 8, 1999, now Pat. No. 6,120,408.

(51) Int. Cl.⁷ ............................................... F16H 48/22
(52) U.S. Cl. ............................. 475/86; 475/88; 475/93
(58) Field of Search ...................................... 475/82–96

(56) References Cited

U.S. PATENT DOCUMENTS

| 1,660,588 A | 2/1928 | Wishart et al. | |
| 1,989,335 A | 1/1935 | Parsons | 236/12 |
| 2,004,929 A | 6/1935 | Centervall | 180/9.2 |
| 2,026,777 A | 1/1936 | Dumble | 74/293 |
| 2,775,141 A | 12/1956 | Ronning | 74/711 |
| 2,899,981 A | 8/1959 | Binks | 138/46 |
| 2,913,928 A | 11/1959 | Double | 74/710.5 |
| 2,922,319 A | 1/1960 | Burner | 74/711 |
| 3,076,529 A | 2/1963 | Zeidler | 188/88 |
| 3,229,550 A | 1/1966 | Nickell | 74/711 |
| 3,230,795 A | 1/1966 | Mueller | 74/711 |
| 3,251,244 A | 5/1966 | Nickell | 74/711 |
| 3,350,961 A | 11/1967 | Dodge | 74/711 |
| 3,361,008 A | 1/1968 | Fallon | 74/711 |
| 3,393,582 A | 7/1968 | Mueller | 74/711 |
| 3,407,599 A | 10/1968 | Ulbricht | 60/54 |
| 3,465,614 A | 9/1969 | Reynolds | 74/763 |
| 3,490,312 A | 1/1970 | Seitz et al. | 74/711 |

(List continued on next page.)

FOREIGN PATENT DOCUMENTS

| FR | 1.217.791 | 12/1959 |
| GB | 2 038 429 | 11/1982 |
| SU | 1079479 | 3/1984 |

*Primary Examiner*—Sherry Estremsky
(74) *Attorney, Agent, or Firm*—Bliss McGlynn & Nolan, P.C.

(57) ABSTRACT

A limited slip differential for an automotive vehicle includes a torque input differential pinion carrier, two differential side gears and a pair of torque output axle half shafts. The differential also includes at least one friction clutch assembly having first friction clutch plates connected driveably to the differential pinion carrier and second friction clutch plates connected driveably to one of the side gears. An annular pressure chamber is defined in the carrier. An annular piston is movably supported within the pressure chamber and adjacent the friction plates of the friction clutch assembly. The limited slip differential further includes a positive displacement gear pump having pumping elements defining high pressure and low pressure ports whereby pressure in the pressure chamber creates a force on the piston that engages a clutch assembly to effect a friction torque bias in the differential through the friction clutch assembly. The piston includes at least one flow control orifice through which fluid may flow from the high pressure port of the positive displacement gear pump via the annular pressure chamber and a thermal compensating valve that is mounted on the piston and is operable to decrease the flow area of the flow control orifice upon increasing temperature. Furthermore, the thermal compensating valve is also operable to increase the flow area of the flow control orifice upon decreasing temperature.

9 Claims, 4 Drawing Sheets

U.S. PATENT DOCUMENTS

| | | | |
|---|---|---|---|
| 3,501,918 A | 3/1970 | Newton, Sr. | 61/17 |
| 3,686,976 A | 8/1972 | Philippi | 74/711 |
| 3,724,289 A | 4/1973 | Kennicutt | 74/711 |
| 3,730,430 A | 5/1973 | Osheroff | 236/101 |
| 3,748,928 A | 7/1973 | Shiber | 74/711 |
| 3,752,280 A | 8/1973 | Check | 192/85 |
| 3,835,730 A | 9/1974 | Pemberton | 74/650 |
| 3,894,446 A | 7/1975 | Snoy et al. | 74/711 |
| 3,923,113 A | 12/1975 | Pagdin | 180/44 |
| 3,961,749 A | 6/1976 | Orcutt | 236/101 |
| 3,964,507 A | 6/1976 | Jandrasi et al. | 137/375 |
| 3,976,094 A | 8/1976 | Jandrasi et al. | 137/375 |
| 3,987,689 A | 10/1976 | Engle | 74/711 |
| 4,012,968 A | 3/1977 | Kelbel | 74/711 |
| 4,031,917 A | 6/1977 | De John et al. | 137/613 |
| 4,041,804 A | 8/1977 | Clark | 74/711 |
| 4,091,901 A | 5/1978 | F'Geppert | 192/61 |
| 4,177,831 A | 12/1979 | Benjamin | 137/513.5 |
| 4,197,823 A | 4/1980 | Schwartz et al. | 123/119 |
| 4,253,491 A | 3/1981 | Worthen et al. | 137/599 |
| 4,258,588 A | 3/1981 | Yum | 74/10.5 |
| 4,263,824 A | 4/1981 | Mueller | 74/711 |
| 4,272,993 A | 6/1981 | Kopich | 74/711 |
| 4,295,550 A | 10/1981 | Hayashi | 192/58 |
| 4,388,196 A | 6/1983 | Lucia | 210/742 |
| 4,445,400 A | 5/1984 | Sullivan et al. | 74/711 |
| 4,493,387 A | 1/1985 | Lake et al. | 180/248 |
| 4,548,096 A | 10/1985 | Giocastro et al. | 74/650 |
| 4,601,359 A | 7/1986 | Weismann et al. | 180/233 |
| 4,606,428 A | 8/1986 | Giere | 180/307 |
| 4,630,505 A | 12/1986 | Willaimson | 74/711 |
| 4,644,822 A | 2/1987 | Batchelor | 74/695 |
| 4,650,028 A | 3/1987 | Eastman et al. | 80/233 |
| 4,679,463 A | 7/1987 | Ozaki et al. | 74/711 |
| 4,702,360 A | 10/1987 | Tanaka | 192/58 |
| 4,714,129 A | 12/1987 | Mueller | 180/248 |
| 4,719,998 A | 1/1988 | Hiramatsu et al. | 192/0.033 |
| 4,727,966 A | 3/1988 | Hiramatsu et al. | 192/0.033 |
| 4,730,514 A | 3/1988 | Shikata et al. | 74/711 |
| 4,732,052 A | 3/1988 | Dewald | 74/711 |
| 4,821,604 A | 4/1989 | Asano | 74/718 |
| 4,867,012 A | 9/1989 | McGarraugh | 74/774 |
| 4,876,921 A | 10/1989 | Yasui et al. | 74/710.5 |
| 4,884,470 A | 12/1989 | Onoue | 74/710.5 |
| 4,905,808 A | 3/1990 | Tomita et al. | 192/85 |
| 4,909,371 A | 3/1990 | Okamoto et al. | 192/103 |
| 4,919,006 A | 4/1990 | Willett et al. | 74/650 |
| 4,924,989 A | 5/1990 | Filderman | 192/103 |
| 4,957,473 A | 9/1990 | Takemura et al. | 475/231 |
| 4,960,011 A | 10/1990 | Asano | 74/650 |
| 4,966,268 A | 10/1990 | Asano et al. | 192/58 |
| 4,974,471 A | 12/1990 | McGarraugh | 74/713 |
| 5,005,131 A | 4/1991 | Imaseki et al. | 364/426.02 |
| 5,087,228 A | 2/1992 | Johansson | 475/88 |
| 5,189,930 A | 3/1993 | Kameda | 74/650 |
| 5,213,125 A | 5/1993 | Leu | 137/15 |
| 5,273,208 A | 12/1993 | Herrick | 236/12.18 |
| 5,310,388 A | 5/1994 | Okcuoglu et al. | 475/88 |
| 5,320,586 A | 6/1994 | Baxter, Jr. | 475/88 |
| 5,386,896 A | 2/1995 | Matsuda | 192/3.29 |
| 5,536,215 A | 7/1996 | Shaffer et al. | 475/88 |
| 5,595,214 A | 1/1997 | Shaffer et al. | 137/517 |
| 5,680,987 A | 10/1997 | Taylor | 239/75 |
| 5,735,764 A | 4/1998 | Shaffer et al. | 475/88 |
| 5,865,702 A | 2/1999 | Yokoyama et al. | 475/117 |
| 5,888,163 A | 3/1999 | Shaffer et al. | 475/88 |
| 5,964,126 A | 10/1999 | Okcuoglu | 74/650 |

LIMITED SLIP DIFFERENTIAL HAVING THERMAL COMPENSATING VALVE FOR REGULATING TORQUE BIAS

This application is a continuation of U.S. Ser. No. 09/264,282, filed on Mar. 8, 1999, U.S. Pat. No. 6,120,408, issued Sep. 19, 2000.

TECHNICAL FIELD

The invention relates to a limited slip differential for an automotive vehicle and, more specifically, to a limited slip differential having a thermal compensating valve which regulates torque bias in the differential.

BACKGROUND OF THE INVENTION

In applications that require a relatively uniform flow of pressurized fluid to a pressure-operated mechanism, such as a friction clutch, the actuating pressure typically is calibrated for operation within a predetermined temperature range. If the operating temperature of the fluid decreases to a low level outside the calibrated temperature range, the resulting fluid viscosity increase may adversely affect performance of the pressure-actuated mechanism. Conversely, if the operating temperature is higher than the calibrated temperature range, viscosity decreases in the hydraulic fluid may adversely affect performance.

If the pressure-actuated mechanism is a friction clutch in a limited slip differential mechanism for an automotive vehicle driveline, the clutch transfers torque between a differential side gear of the differential mechanism and a differential pinion carrier. To compensate for viscosity changes, it is necessary to account for temperature changes in the hydraulic fluid pressure delivered to a pressure chamber of the friction clutch. In the case of a limited slip differential mechanism for a rear wheel drive vehicle, the differential side gear thrust force may be relied upon to apply the clutch. The torque bias in the differential mechanism developed by the clutch during low temperature operation should emulate the torque bias that would normally exist at warmer temperatures for which the differential mechanism is calibrated.

Viscosity change compensation for the pressure fluid is needed to ensure reliable operation of the limited slip differential. A lack of viscosity change compensation could cause premature application of the clutch. In a limited slip differential for a rear wheel drive vehicle, this may contribute to unpredictable handling of the vehicle or cause so-called "crow hopping" of the vehicle during steering maneuvers. In the case of a limited slip differential for a front wheel drive vehicle, a lack of viscosity change compensation may tend to cause an"under-steer" condition during steering maneuvers.

The side gears for a differential mechanism of this kind engage differential pinions that in turn are journalled on a pinion shaft or spider member that is supported by a differential carrier, the carrier in turn being driven by a crown gear. The side gears are connected respectively to each of two axle half-shafts for the vehicle traction wheels. Examples of differential mechanisms of this kind may be seen in U.S. Pat. Nos. 5,536,215, 5,595,214, 5,310,388, and 5,611,746, which are assigned to the assignee of this invention. Their disclosures are incorporated herein by reference.

The limited slip differentials disclosed in these reference patents include a speed sensitive torque bias wherein the bias torque is related to the difference in the speeds of the differential side gears and the pinion carrier. A lack of viscosity change compensation may adversely affect the speed sensitive bias as well as the torque sensitive bias.

DISCLOSURE OF INVENTION

The present invention is directed toward a limited slip differential for an automotive vehicle including a torque input differential pinion carrier, two differential side gears and a pair of torque output axle half shafts. The differential also includes at least one friction clutch assembly having first friction clutch plates connected driveably to the differential pinion carrier and second friction clutch plates connected driveably to one of the side gears. An annular pressure chamber is defined in the carrier. An annular piston is movably supported within the pressure chamber and adjacent the friction plates of the friction clutch assembly. The limited slip differential further includes a positive displacement gear pump having pumping elements defining high pressure and low pressure ports whereby pressure in the pressure chamber creates a force on the piston that engages a clutch assembly to effect a friction torque bias in the differential through the friction clutch assembly. Furthermore, the piston includes at least one flow control orifice through which fluid may flow from the high pressure port of the positive displacement gear pump via the annular pressure chamber and a thermal compensating valve that is mounted on the piston and is operable to decrease the flow area of the flow control orifice upon increasing temperature. Furthermore, the thermal compensating valve is also operable to increase the flow area of the flow control orifice upon decreasing temperature. In this way, the operation of the thermal compensating valve controls the valve of pumped hydraulic fluid from the pressure chamber and thereby controls the torque bias in the differential.

The thermal compensating valve in a limited slip differential environment may also include a second flow control valve in the friction clutch pressure chamber for independently controlling flow of pressurized actuating fluid for the clutch. In the preferred embodiment the thermal compensating valve may include a slide valve plate which slidably engages the base plate and is movable linearly relative to a base plate. Guide edges on the base plate are positioned on opposite sides of the slide valve plate. The slide valve plate has a flow metering edge positioned over the base orifice so that the effective fluid flow area of the orifice is varied as the actuator coil temperature changes. The valve on the piston provides a fluid flow path from the clutch pressure chamber to the low pressure fluid flow return circuit for the positive-displacement pump.

BRIEF DESCRIPTION OF DRAWINGS

FIG. 3 is a cross-sectional view of the base of a temperature compensating valve assembly of the invention taken along the plane of section line 3—3 of FIG. 3a;

BEST MODE FOR CARRYING OUT THE INVENTION

Figure 1:
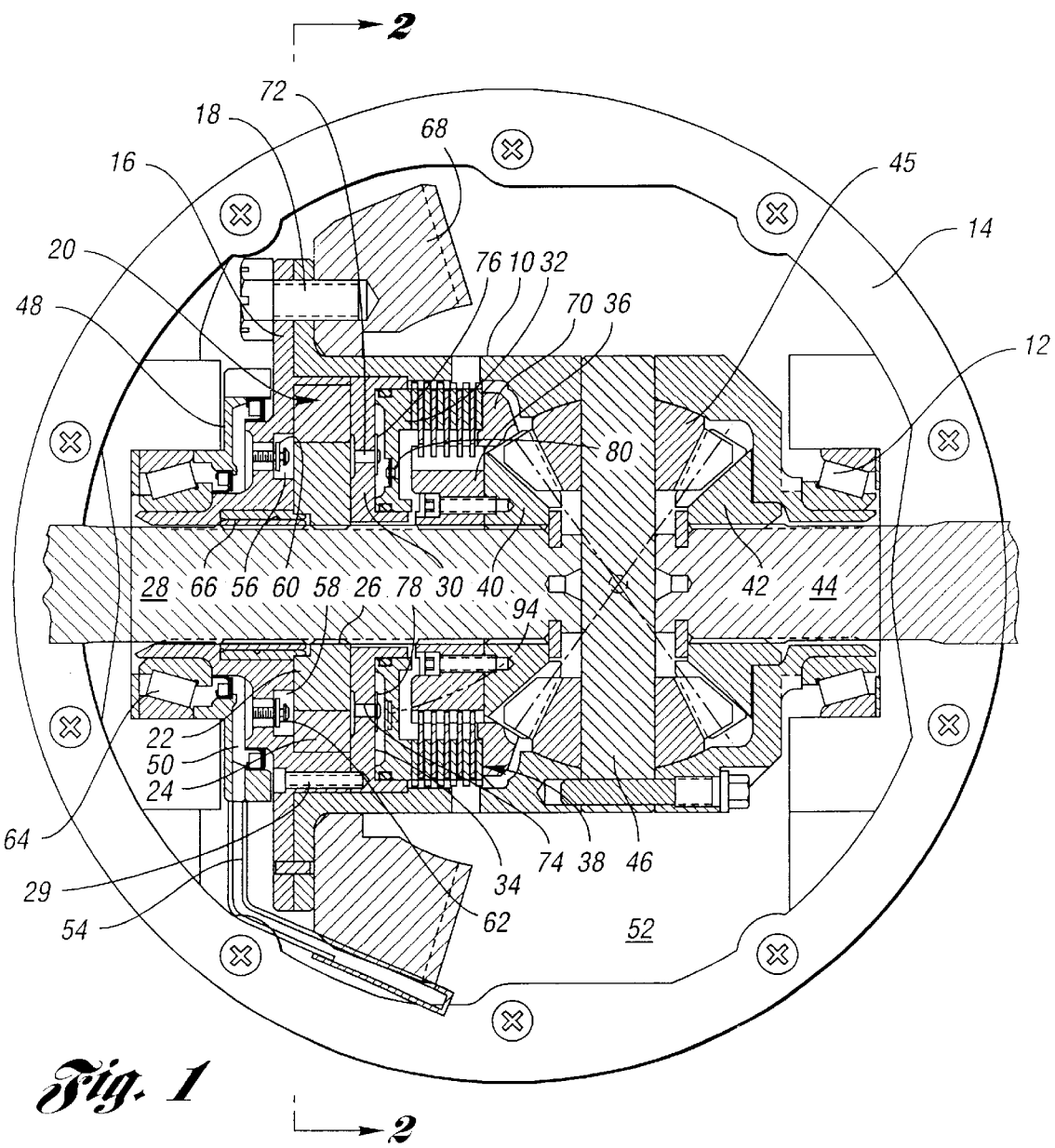
FIG. 1 is a cross-sectional view of a limited slip differential assembly capable of embodying the valve of the present invention.

The preferred embodiment of the invention will be described with reference to a limited slip differential of the type shown in FIG. 1. More specifically, a geared differential shown in FIG. 1 is designed for a rear-wheel drive vehicle. It provides both torque sensitivity and speed sensitivity to effect a total torque bias that is proportional both to the relative speed of the differential carrier and side gears and to the torque transferred to the axle shafts.

The differential carrier includes a carrier housing 10, which is journalled by a roller thrust bearing 12 at the right-hand side of the differential assembly in an axle housing 14. A carrier housing cover plate 16 is secured by bolts 18 to the left-hand side of the differential carrier housing 10. End plate 16 defines a pump cavity that receives a positive-displacement pump 20, which will be described with reference to FIG. 2. Pump 20 includes a first pumping gear element 22 with external teeth and a second pumping gear element 24 with internal teeth.

Figure 2:
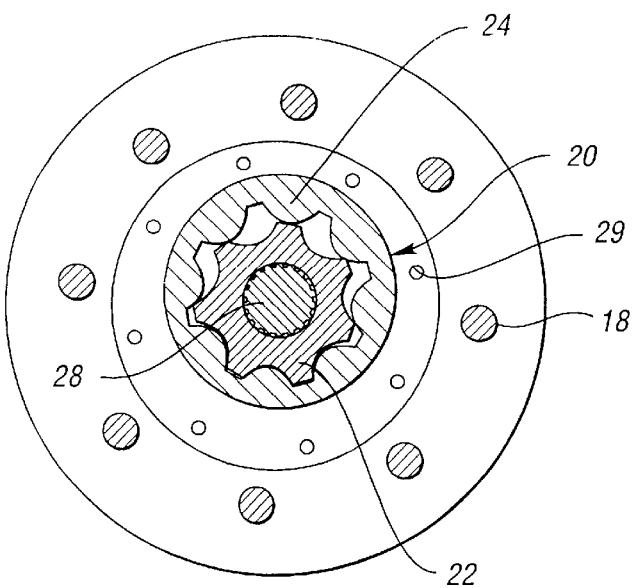
FIG. 2 is a cross-sectional view of a positive-displacement pump, as seen from the plane of section line 2—2 of FIG. 1.

As seen in FIG. 2, the first gear element 22 has external teeth that mesh with internal gear tooth spaces formed in second pumping element 24. The number of external teeth in element 22 is one less than the number of tooth spaces in second pumping gear element 24. The central axis of pumping gear element 24 is offset relative to the axis of pumping gear element 22 so that the tooth spaces define pumping chambers that expand and contract as one pumping element rotates relative to the other. First pumping gear element 22 is splined or keyed at 26 to axle shaft 28.

An annular cylinder member 30 is situated directly adjacent positive-displacement pump 20 and is secured by bolts 29 to the plate 16 so that it rotates with the carrier housing 10. An annular piston 32 is received in the cylinder member 30 to define a clutch pressure chamber 34.

A clutch hub 36 is splined to the axle shaft 28. A friction disk clutch assembly 38 is positioned directly adjacent piston 32. It includes externally splined clutch disks that are connected driveably to the carrier housing 10. Cooperating internally splined clutch disks of clutch assembly 38 are splined to hub 36.

A first side gear 40 and a second side gear 42 driveably engage differential pinions 45 journalled on pinion shaft or spider member 46. Pinion shaft or spider member 46 is connected driveably to carrier housing 10. Side gear 42 is splined to a second axle shaft 44. The axle shafts 28 and 44 are connected to vehicle traction wheels.

A seal cover plate 48 located adjacent the outboard side of cover plate 16 defines a fluid intake cavity 50, which communicates with the interior of the axle housing 14. Axle housing 14 serves as a reservoir for axle fluid as seen at 52. The reservoir 52 communicates with cavity 50 through fluid intake tube 54.

First and second pump intake ports, shown respectively at 56 and 58, are formed in the cover 16. They are located on diametrically opposite sides of the axis of the gear pumping element 22. They are angularly disposed so that they communicate with the gear tooth spaces when the gear tooth spaces are increasing in volume as pumping element 22 and pumping element 24 rotate, one with respect to the other.

When the pumping elements 22 and 24 rotate relative to each other in one direction, intake port 56 receives fluid from reservoir 52. When the direction of relative rotation of the pumping elements 22 and 24 is reversed, fluid is received from reservoir 52 by intake port 58.

Figure 1A:
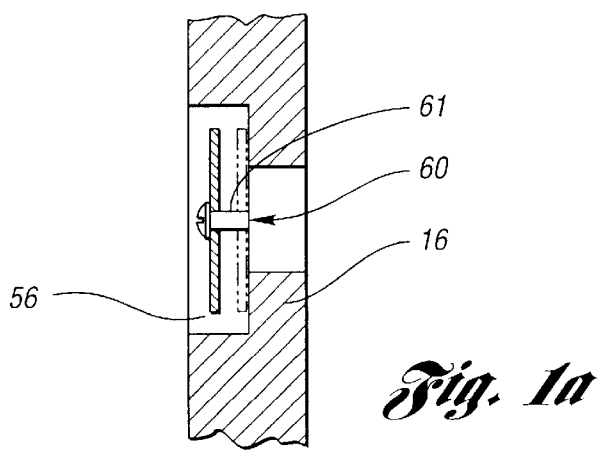
FIG. 1a is a cross-sectional view of a one-way check valve located at the flow inlet port for a positive-displacement pump, which is a part of the differential assembly of FIG. 1.

A one-way check valve plate 60 provides one-way fluid flow from the cavity 50 to the intake port 56. Similarly, one-way check valve plate 62 provides one-way flow from cavity 50 to the intake port 58. The valves are mounted on slide pins 61 secured to the plate 16, as seen in FIG. 1a. These pins accommodate movement of the valve plates between valve port opening and closing positions.

The end plate 16 is journalled by roller thrust bearing 64 in the axle housing 14. Axle shaft 28 is rotatably journalled in plate 16 by bushing 66. The carrier housing 10 is driven by a ring gear or crown gear 68, which meshes with a drive pinion (not shown).

A thrust ring 70 is located directly adjacent the clutch assembly 38. It has an internal cone surface that is engaged by an external cone surface on the side gear 40. Thrust force from the side gear 40 then is transmitted directly to the friction discs of the clutch 38, thus establishing a friction torque bias in the differential assembly. The reaction point for the thrust forces is the cylinder member 30, which is engaged by annular piston 32.

Pump 20 has pressure ports that communicate with gear tooth spaces of the pumping gear elements 22 and 24. They are positioned on diametrically opposite sides of the axis of the pumping element 22 and are angularly positioned at a location coinciding with the pumping element positions where the gear tooth spaces are decreasing in volume as the pumping elements rotate, one with respect to the other.

The pump outlet ports are formed in cylinder member 30. They are indicated at 72 and 74, respectively. When the pumping elements rotate relative to one another in one direction, port 72 is pressurized. When they rotate relative to one another in the opposite direction, port 74 is pressurized. One-way outlet check valve plates for the pump are located at each outlet port 72 and 74, as indicated at 76 and 78, respectively. The valves 76 and 78 are normally closed. One of the outlet check valves is opened when the relative rotation of the pumping gear elements is in one direction, and the other outlet check valve opens when the relative rotation is in the opposite direction. This prevents recirculation of the pumped fluid through the pump.

The piston 32 is provided with a valve opening, which is controlled by a poppet control valve 80. The valve 80 delays application of the clutch as the pumping elements begin to rotate because it initially is open. As differential speed of the side gears increases, the flow through the opening of valve 80 increases. The flow then will cause the valve to close, thereby allowing pressure to build up in the pressure chamber 34.

Check valves 76 and 78 are generally similar in construction to the valve 80 although they assume a normally closed position rather than a normally open position. When one of the valves 76 and 78 is opened, the other is closed. As previously described, when relative rotation of the pumping elements is in one direction, one outlet valve element is closed and the other is opened. When the relative rotation is reversed, the valve plate positions are reversed.

Valve 80 has a bleed orifice (not shown) which bypasses the valve and provides a restricted, continuous flow of fluid past the valve while allowing the pressure buildup to occur in the clutch pressure chamber. This helps to avoid a buildup of contaminants. It also allows the pressure in the clutch pressure chamber to bleed down, thereby allowing the valve to reopen when differential motion of the pinon carrier and the side gears decreases.

Figure 7:
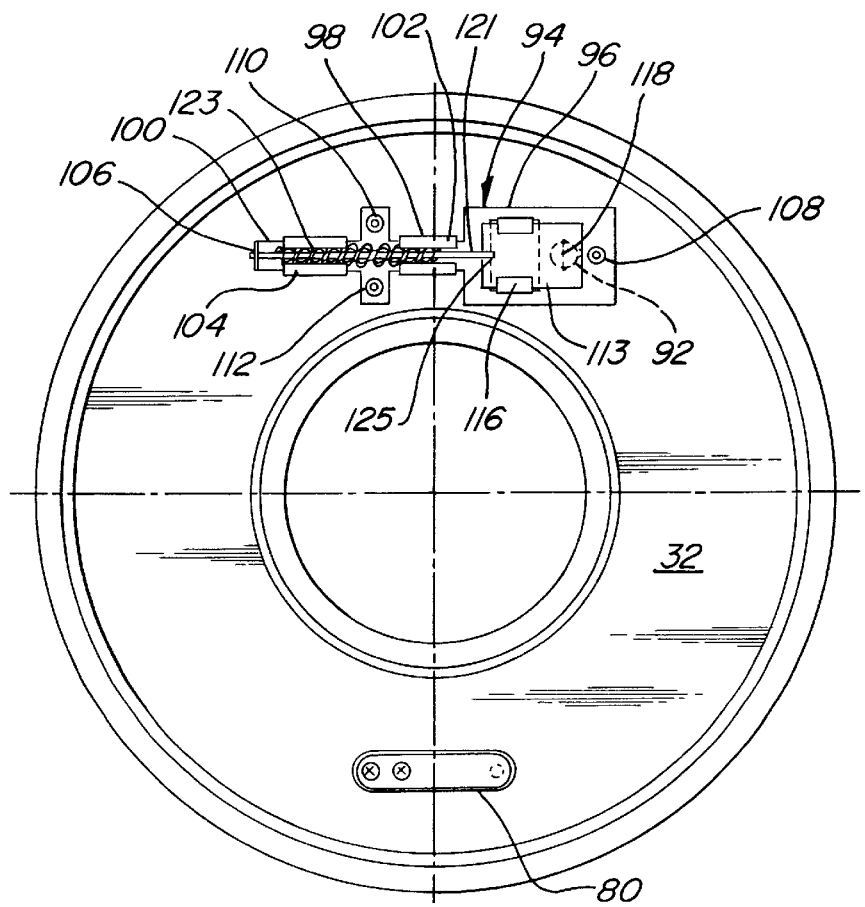
FIG. 7 is a plan view of a second embodiment of the valve of the present invention in combination with a clutch actuating piston used in the differential mechanism of FIG. 1.

Clutch piston 32 is illustrated in FIG. 7, which is a side view of the piston. The piston is provided with a flow control orifice 92, which permits a flow of fluid from the pressure chamber 34 to the flow return circuit leading to the axle housing (not shown), which acts as a fluid reservoir. The flow through orifice 92 is controlled by the thermal compensating valve of the present invention. The thermal compensating valve is mounted on the piston 32 and operable to decrease the flow area of the flow control orifices upon increasing temperature and that is operable to increase the flow area of said opening upon decreasing temperature to control the flow of pumped hydraulic fluid from the pressure chamber and thereby control the torque bias in the differential.

One embodiment of the valve is indicated generally in FIG. 7 by reference numeral 94. It includes a base plate 96, which has a reduced width portion 98 and a reduced width portion 100.

The base plate 96 has a pair of guide tabs 102 at reduced width portion 98 and a pair of guide tabs 104 at reduced width portion 100. The reduced width portion 100 has an end tab 106 to which one end of a thermostatic, double-wound helix element is attached. The double-wound helix element, which will be described subsequently, has an end that is received through an opening in end tab 106. The helix element end is bent at the outboard side of tab 106 so that the helix element is anchored by tab 106 while allowing twisting movement of the end.

The base plate 96 is secured to the piston 32 at three locations 108, 110 and 112. Suitable fasteners, such as rivets, can be provided for this purpose.

A slide valve plate 113 is situated directly adjacent the surface of base plate 96. It is mounted in place by a pair of tabs 116, which are stamped from the base plate 96. The spacing between the tabs 116 is slightly greater than the width of the sliding valve plate 113 so that the valve plate 113 can be freely adjusted fore-and-aft in a linear direction relative to the base plate 96 while being restrained from relative lateral movement.

In the embodiment shown in FIG. 7, the base plate is formed with a triangular orifice 118 which registers with the opening 92. One end 121 of a double-wound bimetallic coil 123 is secured to slide plate 113, as shown at 125. A spot welding technique may be used if desired to establish a connection between the end 121 and the slide valve plate 113. The leading edge of the valve plate slides over the orifice 118 to vary the effective flow area. In the alternative, a triangular orifice may be formed in the slide valve plate 113 and one edge of the orifice may slide over an opening in the base plate to effect a variable flow area.

Figure 3:
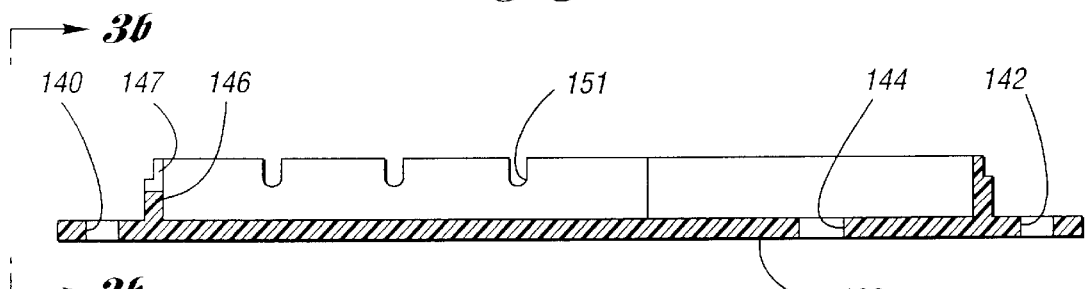
Figure 3A:
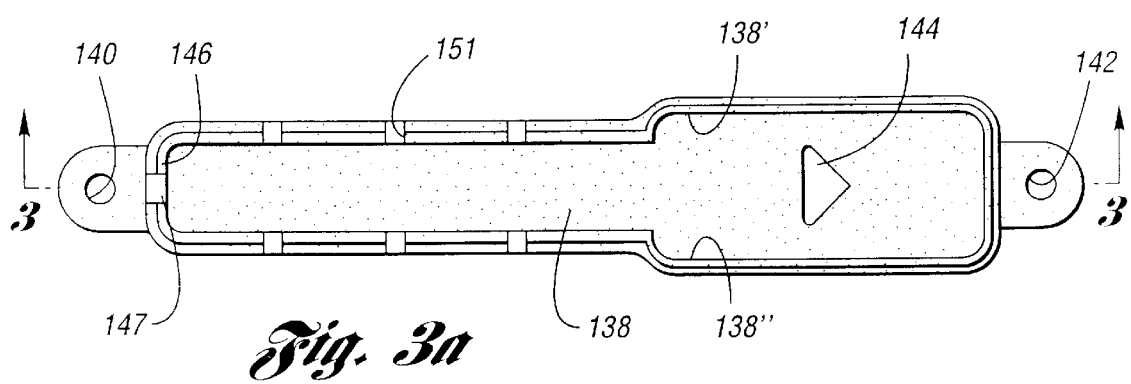
FIG. 3a is a plan view of the base of FIG. 3.
Figure 3B:
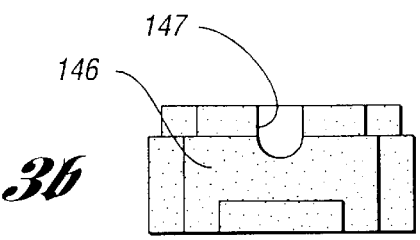
FIG. 3b is an end view of the base of FIG. 3 as seen from the plane of section line 3b—3b of FIG. 3.
Figure 4A:
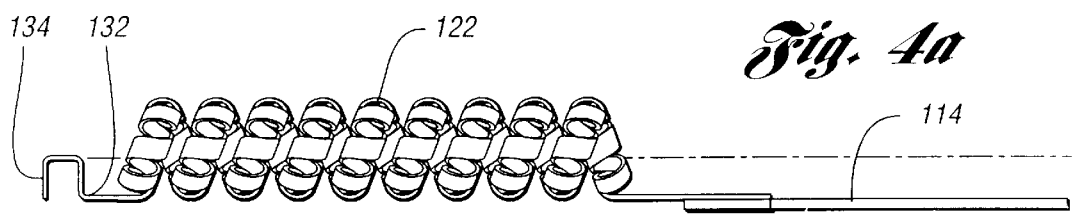
FIG. 4a is a subassembly side view of the bimetallic coil and slide valve plate seen in FIG. 4.
Figure 4:
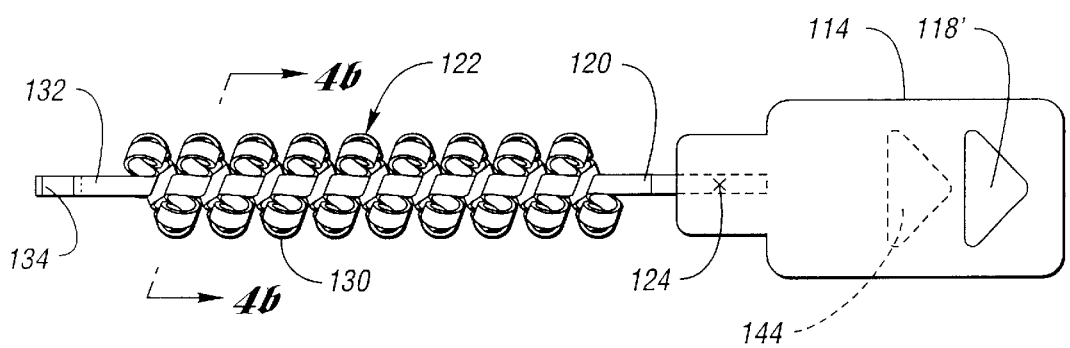
FIG. 4 is a subassembly plan view of a bimetallic coil and slide valve plate which form a part of the temperature compensating valve of the invention.
Figure 4B:
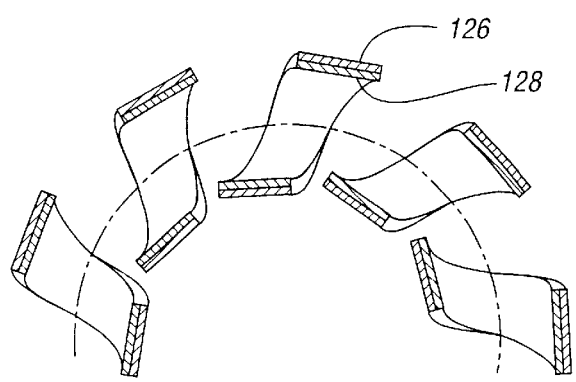
FIG. 4b is a cross-sectional view taken along the plane of section line 4b—4b of FIG. 4.

FIGS. 4, 4a and 4b illustrate a bimetallic coil and slide valve plate subassembly for a second embodiment that will be described with reference to FIGS. 3, 3a and 3b. The coil and slide valve plate subassembly for the embodiment of FIG. 7 is essentially similar, however, to that illustrated in FIGS. 4, 4a and 4b. Their functions are the same.

The double-wound bimetallic element 122 of FIGS. 4, 4a and 4b comprises a bimetallic strip (ASTM type TM2). The bimetallic strip comprises a first metal layer 126 and an adjacent metal layer 128 which are bonded together in known fashion. The bimetallic strip is first wound in a tight helix. The helix then is wound to form a helix of larger diameter, as indicated at 130. The large diameter helix 130 resembles a coil spring having multiple coils. The left end 132 of the bimetallic element forms a hook 134, which engages the base. This will be described subsequently.

Because of the differential coefficients of thermal expansion of the metal 126 with respect to the metal 128, the normal tendency of the bimetallic element to assume a bowed shape, when the element is in its unwound state, establishes a linear motion of the end 120 with respect to the anchored end in response to temperature changes. The end 120 may be secured to slide valve plate 114 by welding, as shown at 124. When the temperature of the fluid drops, the double-wound helix bimetallic coil retracts, thereby drawing the slide valve plate 114 to the left. This increases the effective size of the flow control orifice. The orifice acts as a pressure dump from the pressure chamber behind the piston 90 and prevents the clutch 38 from engaging prematurely at cold temperatures due to the increased fluid viscosity.

FIG. 4a shows a side view of the thermal, bimetallic, double-wound helix element, mentioned earlier, corresponding to the bimetallic coil and slide valve plate assembly shown in FIG. 7. The coil construction of FIG. 4a is the same as the coil construction of FIG. 7, although the end 132, as mentioned previously, is formed with a U-shaped hook 134 that is adapted to be received in an end opening in a molded housing that will be described subsequently. This provides an anchor for the end 132 of the coil, designated by reference character 122. The right-hand end of the coil 122 is secured, such as by welding, to the slide valve plate 114.

FIGS. 3, 3a, 3b, 4 and 4b show an embodiment, mentioned previously, for the thermal compensating valve assembly of the invention. This is the preferred embodiment. Unlike the design seen in FIG. 7, which has a steel base 96, the preferred construction of FIGS. 3–4 comprises a plastic or phenolic base, seen at 138. The material may be a resin, preferably polyetherimide (Ultem 1000, manufactured by the G.E. Plastics Division of General Electric Company). The right and left ends of base 138 are provided with attachment openings 140 and 142, which receive rivets or some other suitable fastener device for securing the base 138 to the piston 32. The base 138 is provided with a flow opening 144, which corresponds to opening 92 seen in FIG. 7.

Base 138 has guide edges 138' and 138", which guide the linear motion of slide valve plate 114. As in the case of the embodiment of FIG. 7, where the valve plate 113 has a sliding clearance with respect to tabs 116, there is a sliding clearance between valve plate 114 and guide edges 138' and 138".

The base opening 144, which preferably is triangular, as seen in phantom in FIG. 4, registers with a similarly shaped opening 118' in slide valve plate 114. The edge of the opening 118' moves over the opening 144 as the temperature of the bimetallic coil 122 changes.

The left end of a double-wound, helix, bimetallic coil of the type shown in FIGS. 4 and 4a is secured to a peripheral wall 146, thereby providing an anchor for the left end of the coil. The wall 146 has a half-round opening 147 at its left end, which receives the U-shaped hook 134 of the bimetallic coil end 132. The end 132 is not restrained from twisting motion, although it is restrained from linear motion during operation when the coil temperature changes.

Figure 5:
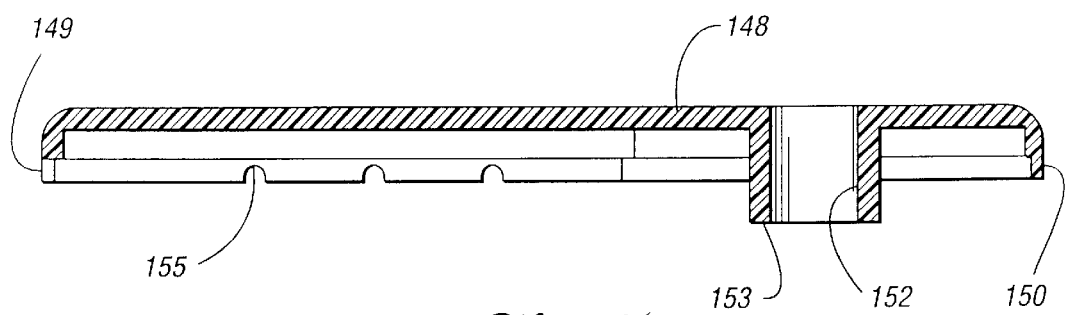
FIG. 5 is a cross-sectional view of a cover that is connected to the base of FIG. 3. It is taken along the plane of section line 5—5 of FIG. 6.
Figure 6:
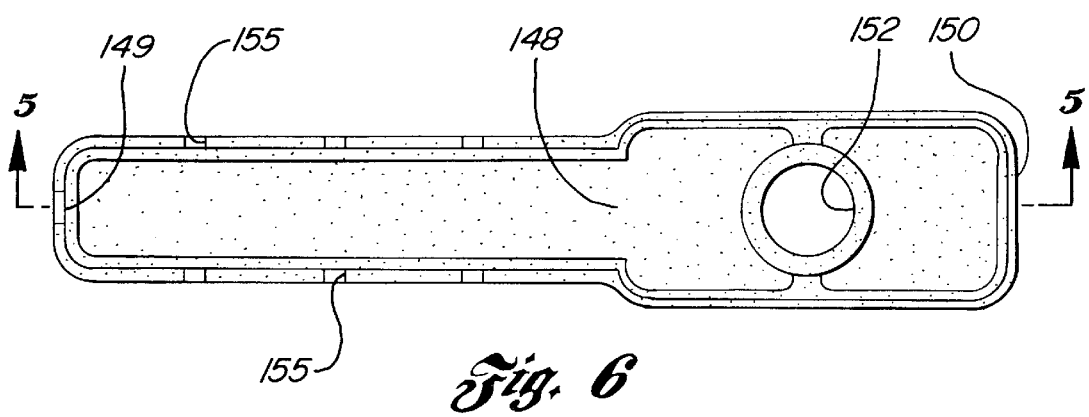
FIG. 6 is a plan view of the cover shown in FIG. 5.

The valve assembly includes further a cover 148, seen in FIGS. 5 and 6. The cover 148 defines a chamber that encloses the bimetallic coil and the slide valve element. Cover 148 has a peripheral wall 150 that registers with the corresponding peripheral wall 146 for base 138. The cover 148 is formed of the same material as the base 138. The cover 148 and the base 138 may be fastened together by ultrasonic welding, by solvent bonding or by an integrated "snap" feature.

The wall 150 has a half-round opening 149, which registers with half-round opening 147 in base 138. When assembled, the hook 134 is held in the full rounded opening defined by the half-round openings 147 and 149. Any slight twisting motion of the bimetallic coil end 132 is accommodated.

The cover 148 is provided with an opening 152 which is aligned with the opening 144 in the base 138. A guide surface 153 on cover 148 surrounds opening 152. It positions the slide valve plate 114 for linear, sliding movement. There is sufficient clearance between valve plate 114 and surface 153 to avoid binding.

In the preferred embodiment shown in FIGS. 3, 3a, 5 and 6, the fluid is permitted to flow around the bimetallic coil. This flow is improved by forming a plurality of openings in the peripheries of cove 148 and base 138. The openings may be formed by half-round recesses 151 in the peripheral wall 146 for base 138 and by half-round recesses 155 in the peripheral wall 150 for the cover 148. When the cover and the base are assembled together, recesses 151 register with recesses 155 to define full openings.

The characteristic curve in a plot of the effective area of the flow controlling orifice as a function of temperature of the coil can be varied depending upon the geometry of the orifice formed in the base. In the case of the embodiments shown in FIGS. 3, 3a and 7, the effective orifice size will vary nonlinearly. The shape of the characteristic curve, however, may be changed by changing the shape of the orifice depending upon the requirements of the particular differential design or the requirements of other applications for which the invention is suited. Experiments have shown that there is more motion of the movable valve plate and more valve plate actuating force for a given package size than other types of bimetallic valves.

The bimetallic coil is constructed using long, flat strip stock bimetallic material. The bimetallic coil delivers the maximum linear motion and linear force for its package size. The normal tendency of a bimetallic strip to assume a bowed condition in its pre-wound state due to a change in temperature is transformed into a linear motion of the slide valve element. As previously explained, this compensates for changes in the fluid viscosity due to temperature changes.

The change in the viscosity of a fluid usually is a nonlinear function of temperature change. That is true, for example, for axle lube fluids commonly used with automotive vehicles. Since the length of the bimetallic coil changes linearly over its normal operating range, the orifice shape can be tailored to establish the correct relationship between the linear motion of the slide and the nonlinear viscosity changes of the hydraulic fluid. Moving the slide across a triangular shaped flow control orifice, for example, will have the effect of opening the orifice area in an exponential fashion. Other orifice shapes can be used depending upon the fine tuning requirements of a particular application.

The thermal compensating valve performs reliably in an application such as an automotive differential environment, notwithstanding the hydraulic pressures to which the slide valve is exposed. Those pressures may exceed, for example, 1000 psi. Further, the valve will function reliably throughout a wide temperature range. For example, the temperature range in an automotive differential or transmission environment might be −40° to 300° F.

The thermal compensating valve further will resist leakage across the orifice when it is in its closed state during operation with high fluid temperatures. It also is capable of withstanding constant oil emersion without deterioration.

The bimetallic coil valve assembly of the preferred embodiment makes it possible for the limited slip differential of FIG. 1, for example, to operate during cold temperatures by dumping hydraulic fluid, thereby emulating the performance during operation at warm temperatures at which the poppet control valve calibration is optimized. Premature closing of the piston valve 80, in the case of the assembly of FIG. 1, can be avoided. This improves the predictability of the function of the differential.

Although preferred embodiments of the invention have been described, modifications to the invention may be apparent to a person skilled in the art without departing from the scope of the invention. All such modifications and equivalents thereof are covered by the following claims.

What is claimed is:

1. A limited slip differential for an automotive vehicle, said limited slip differential comprising:

a torque input differential pinion carrier, two differential side gears and a pair of torque output axel half-shafts;

at least one friction clutch assembly including first clutch friction plates connected drivably to the differential pinion carrier and second clutch friction plates connected drivably to one of said side gears;

an annular pressure chamber defined in said carrier, an annular piston movably supported within said pressure chamber and adjacent the friction plates of said friction clutch assembly;

a positive displacement gear pump having pumping elements defining high pressure and low pressure ports whereby pressure in said pressure chamber creates a force on said piston that engages said clutch assembly to effect a friction torque bias in the differential through said friction clutch assembly;

said piston including at least one flow control orifice through which fluid may flow from said high pressure port of said positive displacement gear pump via said annular pressure chamber and a thermal compensating valve that is mounted on said piston, said thermal compensating valve including a slide valve plate movable linearly relative to said piston and having a flow metering edge which is positioned over the flow control orifice in said piston such that movement of said slide valve plate changes the effective fluid flow area of said orifice as a function of the temperature of the hydraulic fluid so that said thermal compensating valve is operable to decrease the flow area of said flow control orifice upon increasing temperature and is operable to increase the flow area of said flow control orifice upon decreasing temperature to control the flow of pumped hydraulic fluid from said pressure chamber and thereby control the torque bias in said differential.

2. A limited slip differential as set forth in claim 1 wherein said piston includes guides positioned on opposite sides of said slide valve plate to facilitate rectilinear movement of said slide valve plate relative to said piston.

3. A limited slip differential as set forth in claim 2 wherein said slide valve plate includes an opening that registers with said fluid flow control orifice such that rectilinear movement of said slide valve plate as a function of the temperature of the hydraulic fluid increases or decreases the amount of registration between said opening and said fluid flow control orifice.

4. A limited slip differential as set forth in claim 3 wherein said opening has a margin that defines said flow metering edge, said flow metering edge being generally linear and extending transversely across said fluid flow control orifice in an oblique direction relative to the direction of the rectilinear movement of said slide valve plate.

5. A limited slip differential as set forth in claim 4 wherein said flow metering edge of said opening in said slide valve plate defines at least one side of a triangle.

6. A limited slip differential as set forth in claim 5 wherein said slide valve plate further includes a temperature sensitive actuator having a pair of ends with one end secured to said piston and the other end secured to said slide valve plate to impart rectilinear movement to said slide valve plate in response to changes in temperature of said hydraulic fluid.

7. A limited slip differential as set forth in claim 6 wherein said temperature sensitive actuator includes a bi-metallic, double-wound coil having first and second ends.

8. A limited slip differential as set forth in claim 7 wherein said actuator coil comprises a bimetallic strip wound in a first helical configuration with a first coiled diameter end also being wound in a second helical configuration with a second coiled diameter greater than the first coiled diameter whereby said slide valve moves linearly as a function of changes in temperature of said valve.

9. A limited slip differential as set forth in claim 8 wherein the effective size of said fluid flow control orifice increases as the temperature of the bi-metallic actuator coil decreases thereby compensating for increases in viscosity of fluid flowing through the flow control orifice.

\* \* \* \* \*